May 28, 1935.  G. J. DEHN  2,003,139
GREASE TRAP
Filed May 29, 1930
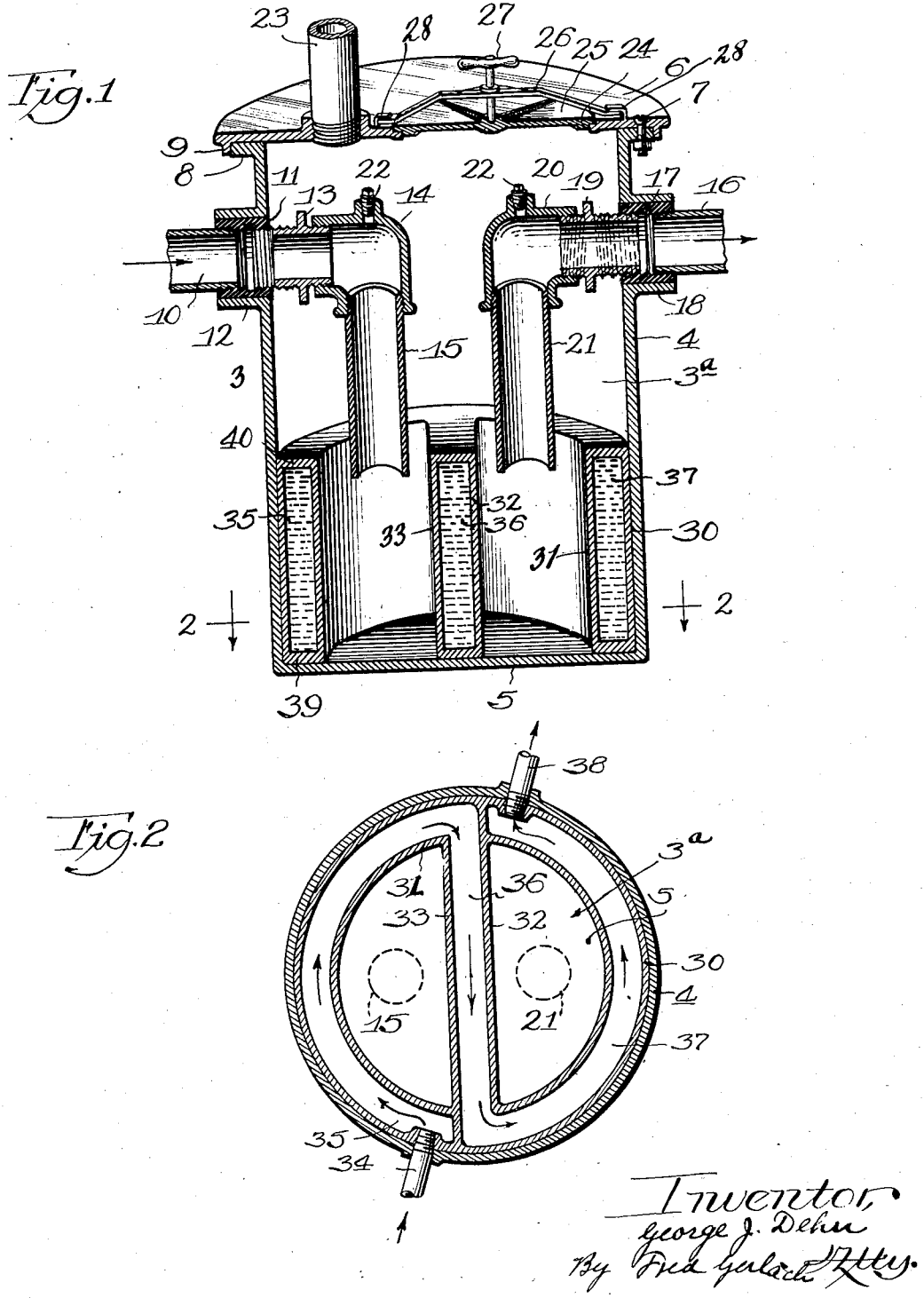
Inventor,
George J. Dehn
By Fred Gerlach Atty.

Patented May 28, 1935

2,003,139

UNITED STATES PATENT OFFICE 2,003,139

GREASE TRAP

George J. Dehn, Chicago, Ill.

Application May 29, 1930, Serial No. 456,860

3 Claims. (Cl. 182—9)

The invention relates generally to grease traps. More particularly the invention relates to that type of trap which comprises a basin through which drainage is adapted to pass, and operates to collect or segregate the grease so that the latter will not pass from the basin with the remainder of the drainage.

One object of the invention is to provide a grease trap of this type with improved means for cooling the drainage to congeal the grease in the trap.

Another object of the invention is to provide an improved grease trap which is composed of parts which can be readily assembled and separated.

Other objects of the invention will appear from the detailed description.

The invention consists in the several novel features hereinafter set forth and more particularly defined by claims at the conclusion hereof.

In the drawing: Fig. 1 is a sectional perspective of a grease trap embodying the invention. Fig. 2 is a section taken on line 2—2 of Fig. 1.

The invention is exemplified in a trap comprising a receptacle or basin 3 which is formed with a cylindrical wall 4, an integral bottom wall 5 and a top 6 which is removably secured by bolts 7 to the basin and forms a top closure. An annular flange 8 is formed at the upper end of the wall 4 and an annular rib 9, integral with the top 6, fits around the flange 8. The chamber 3ª in the basin is adapted to receive drainage through a connection comprising an inlet pipe 10 which is screw-threaded into the outer end of a bushing 11 which is secured in a boss 12 which projects from, and is integral with, the wall 4 of the basin; a nipple 13, which is screwthreaded into the inner end of the bushing 11; an elbow 14, the horizontal member of which is screw-threaded onto the inner end of the nipple 13; and a pipe 15 which is screw-threaded into the downwardly extending member of the elbow 14. Nipple 13 is provided with right and left-hand screw-threads, and bushing 11 and elbow 14 are correspondingly threaded so that by turning the nipple 13 the elbow 14 and bushing 11 will be drawn together and secured in place without rotating the elbow relatively to the bushing. This construction permits the elbow and pipe 15 to be assembled before they are inserted in the basin, and also permits them to be removed by turning the nipple 13.

An outlet connection for the drainage is provided. This connection is similar in construction to the inlet connection, and comprises a discharge pipe 16 which is screw-threaded into a bushing 17 which is cast in a boss 18 which is integral with the side wall 4; a nipple 19 having its outer end threaded into the inner end of bushing 17, an elbow 20 which is threaded onto the inner end of nipple 19; and a vertical pipe 21 which is screw-threaded into the downwardly extending member of the elbow 20. Nipple 19 is provided with right and left threads for engaging corresponding threads on the bushing 17 and elbow 20 to permit said elbow to be connected or disconnected from the bushing 17. The lower ends of pipes 15 and 21 are open to discharge and receive drainage respectively. Each of the elbows 14 and 20 is provided with a clean-out plug 22 which permits, when removed, a cleaning device to be passed through the pipes 15 and 16 in event any deposits should accumulate therein.

A vent pipe 23 is connected to the top 6. Said top is formed with a hand hole 24 which is normally closed by a cap 25 which is removably held to close the hole by a saddle 26 and a screw 27. The saddle engages lugs 28 on the top 6. By loosening the screw and turning the saddle, the cap may be removed to provide access to the chamber in the basin.

The improved cooling means comprises a hollow structure or jacket which is adapted to fit in the lower portion of the basin and is chambered to permit cooling water to circulate therethrough. This jacket comprises a cylindrical outer wall 30 which substantially fits the inner periphery of the basin; an inner cylindrical wall 31, cross walls 32 and 33 and a bottom wall 39 and a top wall 40. Said top and bottom walls extend between the outer cylindrical wall 30 and the inner cylindrical wall 31, and between cross walls 32 and 33, so that the cooling liquid will be confined to the chambers between said walls. An inlet pipe 34 for cooling liquid extends through wall 4 of the basin, and has a tapered thread engaging a thread in said wall and extends through and is threaded into the outer wall 30 of the jacket for the cooling liquid. Cross wall 33 is extended across the chamber in the jacket adjacent pipe 34, so that the cooling water will pass through the semi-circular chamber 35 in the jacket and around one side thereof to the chamber 36 between walls 32 and 33. Wall 32 is extended at the end of semi-circular chamber 35 to the outer wall 30 of the jacket, so that the water will pass from chamber 33 across the basin, and thence into a semi-circular chamber 37 which communicates with the other end of chamber 36 and conducts the cooling water to the discharge pipe 38 which extends through and is threaded to the wall 4 of the basin and also to the wall 30 of the jacket. This construction forms a water jacket with a passage for the water, whereby it is caused to circulate around the outside of and across the basin in its flow from the inlet pipe 34 to the outlet pipe 38, and also forms a baffle over which the drainage must flow in passing from the inlet pipe 15 to the outlet pipe 21.

In operation the drainage entering pipe 13 will be deflected downwardly by elbow 14 and discharged through the lower end of pipe 15 into the chordal-chamber between walls 31 and 33 of the jacket for the cooling liquids. In this compartment the drainage will be subjected to the cooling influence of the water-jacket and its flow will be interrupted by the baffle forming a part of the water jacket, so that the grease will be separated from the water and pass to the top of the water column usually maintained in the trap. The drainage passing over the baffle will enter the chordal chamber at the discharge side of the baffle, and pass upwardly through pipe 21, elbow 20, nipple 19, and pipe 18 to the sewer. The cooling liquid enters the inlet pipe 34 and passes around the semi-circular chamber at one side of the water jacket, then across the baffle and then around the other semi-circular chamber to the discharge connection. The sinuous course of the cooling liquid, caused by this formation of the jacket and baffle, causes all portions of the drainage to be efficiently cooled to separate the grease from the drainage.

The trap described exemplifies one in which a circular cooling jacket is separately formed from the basin and removably held therein; in which the cooling liquid is caused to circulate around and across the drainage chamber to efficiently cool the drainage for the separation of the grease; in which the inlet and outlet connections are composed of parts which can be easily mounted in the basin and removed therefrom; which is efficient in operation and which can be produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a grease trap of the character described, the combination of a basin, inlet and outlet connections for drainage through the basin, an annular, drainage cooling jacket in the lower end of the basin adapted to have a cooling medium circulated therethrough and embodying semi-circular chambers and a cross chamber connecting the semi-circular chambers and an inlet and an outlet for the cooling medium connected to the semi-circular chambers at the ends which are remote from the points of the connections between the cross chamber and the semi-circular chambers to cause the medium to flow successively through said chambers.

2. In a grease trap of the character described, the combination of a basin provided with a removable top, means for passing drainage through the basin comprising horizontally extending inlet and outlet pipes outside of the basin, a pair of vertically extending, laterally spaced pipes in the basin, and a pair of horizontal nipples extending through the side wall of the basin and between the inlet and outlet pipes and the upper ends of the vertically extending pipes in the basin and serving to space the vertically extending pipes from the side wall of the basin and to permit of removal of said vertically extending pipes, and means for cooling the drainage during passage thereof through the basin so as to congeal the grease, consisting of a jacket disposed in the lower end and formed separately from the basin and having a continuous chamber about the side wall of the basin and around the lower ends of the vertically extending pipes of the drainage-passing means, and pipe-connections extending through the basin and adapted to circulate a cooling medium through the chamber, said jacket being removable through the top of the basin for repair or replacement purposes upon removal of said vertically extending pipes and disconnection of the pipe-connections.

3. In a grease trap of the character described, the combination of a cylindrical basin provided with a removable top, means for passing drainage through the basin comprising horizontally extending inlet and outlet pipes outside of the basin, a pair of vertically extending, laterally spaced pipes in the basin, and a pair of horizontal nipples extending through the side wall of the basin and between the inlet and outlet pipes and the upper ends of the vertically extending pipes in the basin and serving to space the vertically extending pipes from the side wall of the basin and to permit of removal of said vertically extending pipes, and means for cooling the drainage during passage thereof through the basin so as to congeal the grease, consisting of a jacket disposed in the lower end of and formed separately from the basin and embodying an annular chamber extending about the inner face of the side wall of the basin and around the lower ends of the vertically extending pipes, and a baffle separating the lower ends of said vertically extending pipes and extending across the space within the annular chamber, and pipe-connections extending through the side wall of the basin and adapted to circulate a cooling medium through the annular chamber, said jacket being removable through the top of the basin for repair or replacement purposes upon removal of said vertically extending pipes and disconnection of the pipe-connections.

GEORGE J. DEHN.